United States Patent
Clarkson

(10) Patent No.: US 9,677,397 B2
(45) Date of Patent: Jun. 13, 2017

(54) DOWNHOLE DETECTION

(71) Applicant: Petrowell Limited, Dyce, Aberdeen (GB)

(72) Inventor: Hugh Clarkson, Aberdeen (GB)

(73) Assignee: Petrowell Limited, Aberdeen (GB)

( * ) Notice: Subject to any disclaimer, the term of this patent is extended or adjusted under 35 U.S.C. 154(b) by 416 days.

(21) Appl. No.: 13/800,183

(22) Filed: Mar. 13, 2013

(65) Prior Publication Data
US 2014/0239959 A1    Aug. 28, 2014

(30) Foreign Application Priority Data

Feb. 28, 2013 (GB) .................................. 1303614.0

(51) Int. Cl.
| | | |
|---|---|---|
| *G01V 3/00* | (2006.01) | |
| *E21B 47/09* | (2012.01) | |
| *G01V 3/10* | (2006.01) | |
| *G01V 3/30* | (2006.01) | |
| *E21B 47/12* | (2012.01) | |

(52) U.S. Cl.
CPC ........ *E21B 47/0905* (2013.01); *E21B 47/122* (2013.01); *G01V 3/10* (2013.01); *G01V 3/30* (2013.01)

(58) Field of Classification Search
CPC ... G01V 3/30; G01V 3/18; G01V 3/32; G01V 3/10; G01V 3/20; G01R 33/44
USPC ............... 324/324–375; 73/152.46; 250/254; 336/92, 212
See application file for complete search history.

(56) References Cited

U.S. PATENT DOCUMENTS

| | | | |
|---|---|---|---|
| 4,231,908 A | 11/1980 | Pennino | |
| 4,806,928 A | 2/1989 | Veneruso | |
| 5,971,072 A | 10/1999 | Huber et al. | |
| 6,021,095 A | 2/2000 | Tubel et al. | |
| 6,215,304 B1 * | 4/2001 | Slade | 324/303 |
| 2004/0196047 A1 * | 10/2004 | Fanini et al. | 324/339 |

(Continued)

FOREIGN PATENT DOCUMENTS

EP    0299863 B1    2/1998

OTHER PUBLICATIONS

International Search Report and Written Opinion received in corresponding PCT Application No. PCT/GB2014/050601, dated Dec. 3, 2014.

(Continued)

*Primary Examiner* — Thang Le
(74) *Attorney, Agent, or Firm* — Blank Rome LLP

(57) ABSTRACT

A system for use in downhole detection comprises a downhole arrangement defining a throughbore and a tool deployable through the throughbore of the downhole arrangement. The system further comprises a primary electromagnetic element provided on one of the downhole arrangement and the deployable tool and a secondary electromagnetic element provided on the other of the downhole arrangement and the deployable tool, wherein the primary and secondary electromagnetic elements are configurable for electromagnetic coupling therebetween. Such a system may be used for determining a status and/or an identity of a downhole tool in an oil or gas well from a determined degree of electromagnetic coupling between the primary and secondary electromagnetic elements.

72 Claims, 6 Drawing Sheets

(56) References Cited

U.S. PATENT DOCUMENTS

| | | | |
|---|---|---|---|
| 2005/0168225 A1* | 8/2005 | Haber | G01V 3/26 |
| | | | 324/368 |
| 2006/0254768 A1 | 11/2006 | De Jesus et al. | |
| 2008/0053662 A1 | 3/2008 | Williamson et al. | |
| 2008/0202768 A1 | 8/2008 | Hansen | |
| 2009/0066535 A1* | 3/2009 | Patel et al. | 340/853.2 |
| 2009/0085701 A1 | 4/2009 | Veneruso | |
| 2009/0151932 A1 | 6/2009 | Hall et al. | |
| 2013/0057364 A1* | 3/2013 | Kesler et al. | 333/219.2 |
| 2013/0120093 A1* | 5/2013 | Deville | E21B 17/028 |
| | | | 336/115 |
| 2013/0320985 A1* | 12/2013 | Liu | G01V 3/12 |
| | | | 324/339 |

OTHER PUBLICATIONS

Examination Report received in corresponding Australian application No. 2013201675, dated Jul. 30, 2014, 6 pages.

Search Report in corresponding Great Britain application No. GB1303614.0, dated Aug. 20, 2013.

Examination Report No. 1 received in corresponding Australian Appl. 2015207914. dated Jan. 19, 2016, 2-pgs.

\* cited by examiner

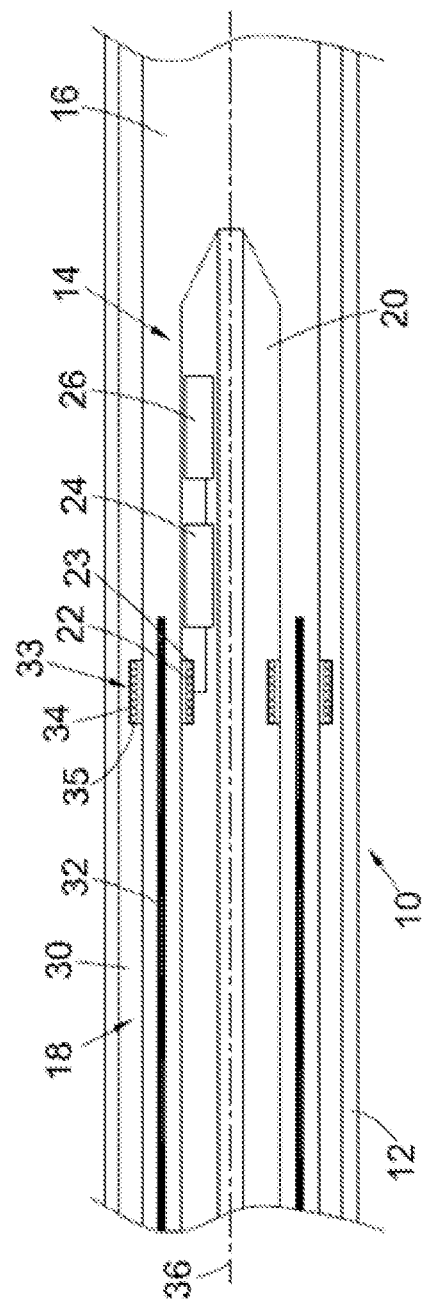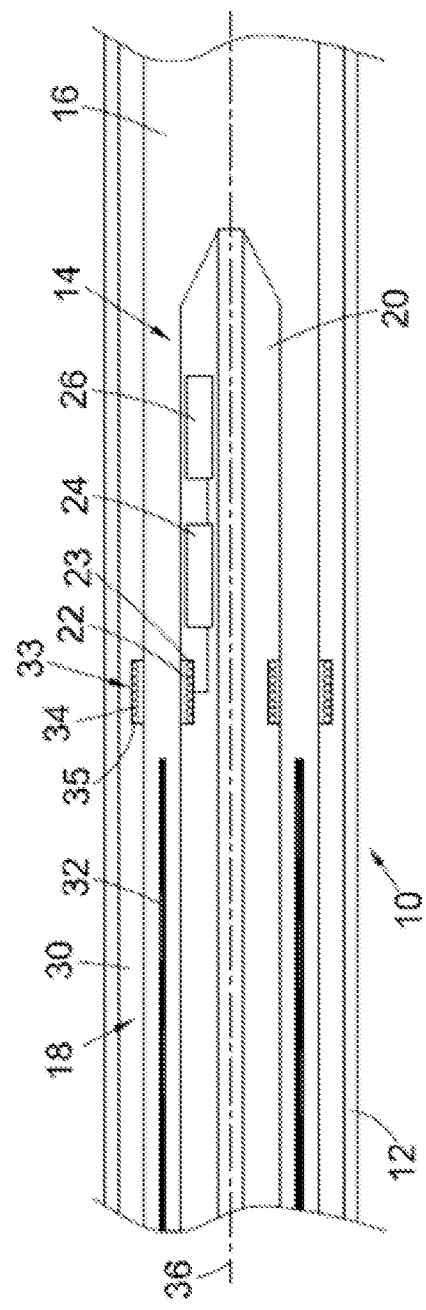
Fig. 1(a)
Fig. 1(b)

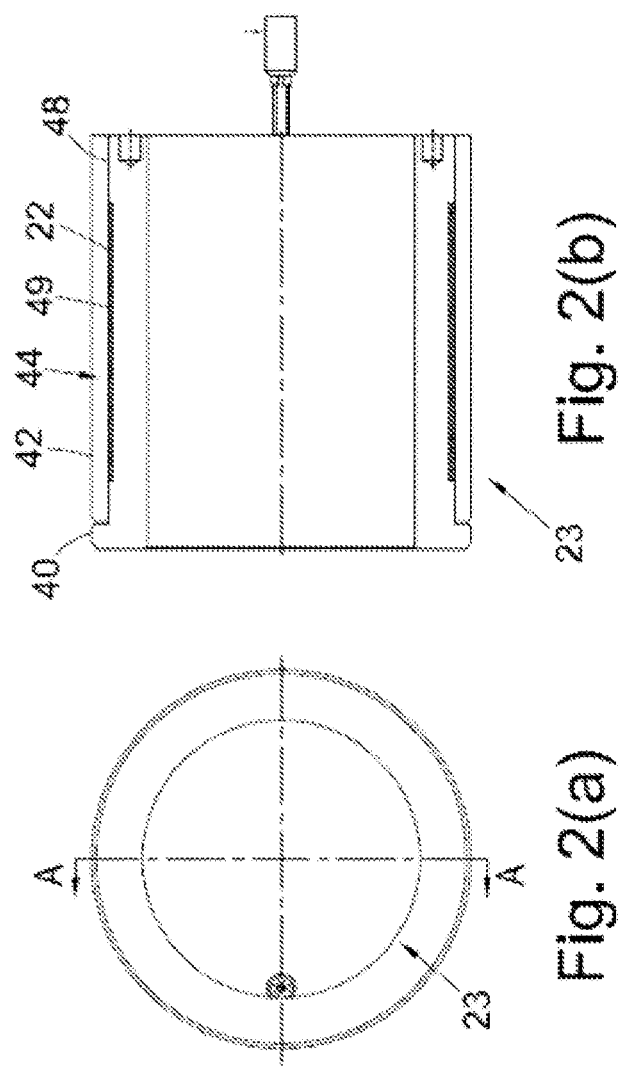

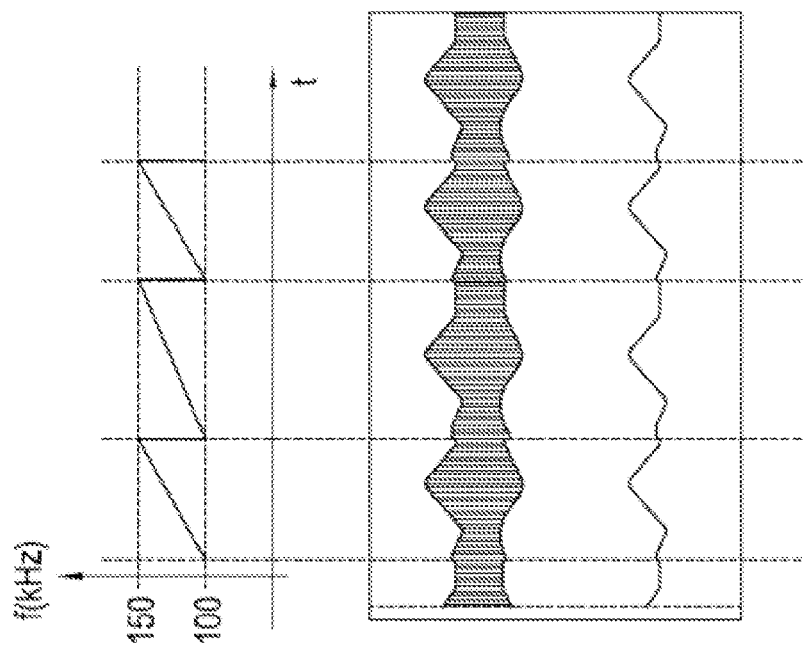
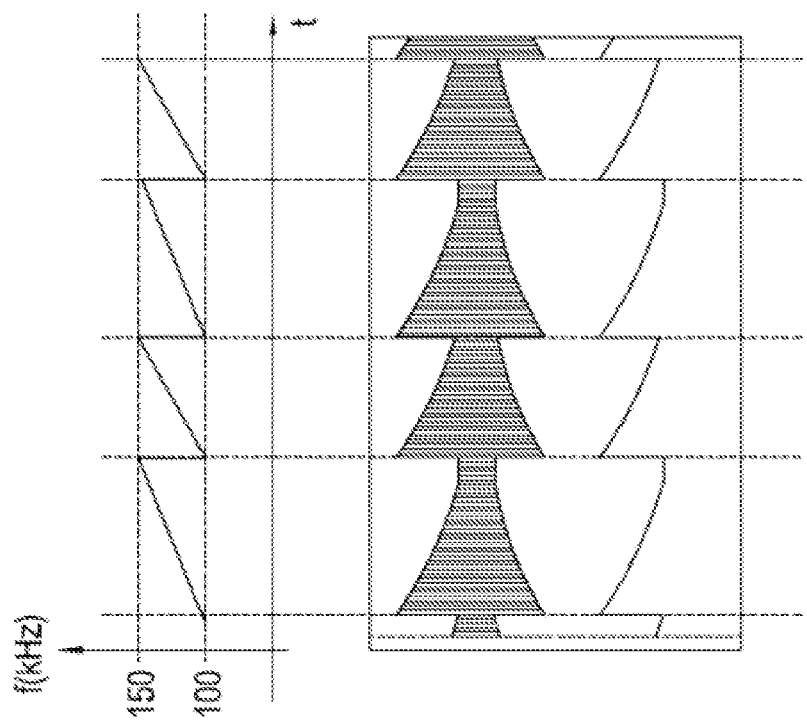

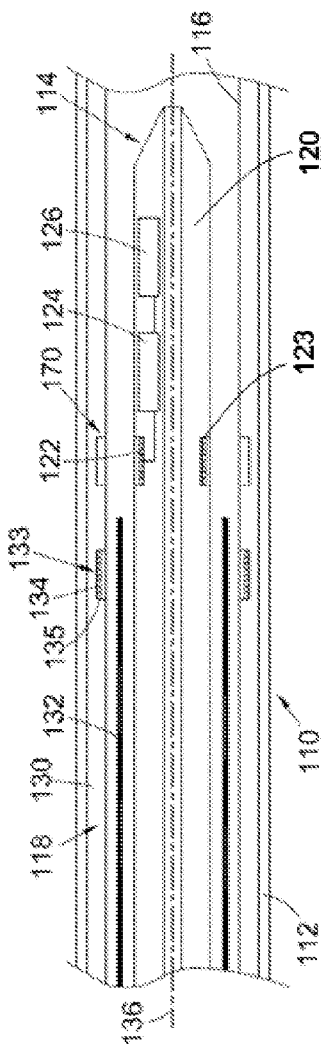
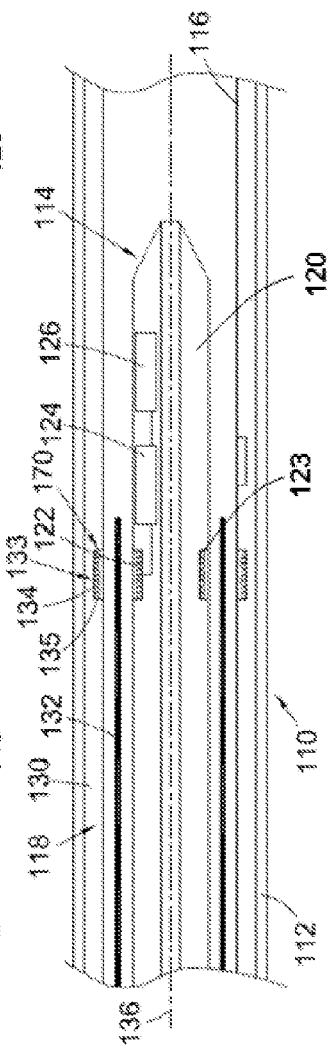
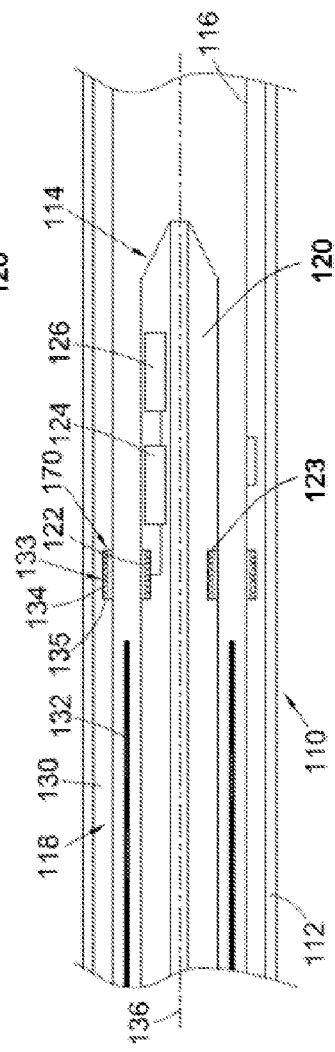

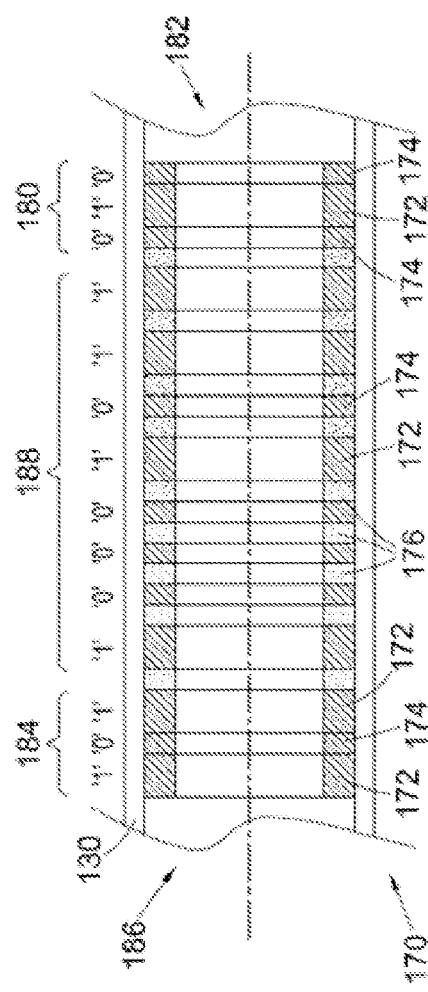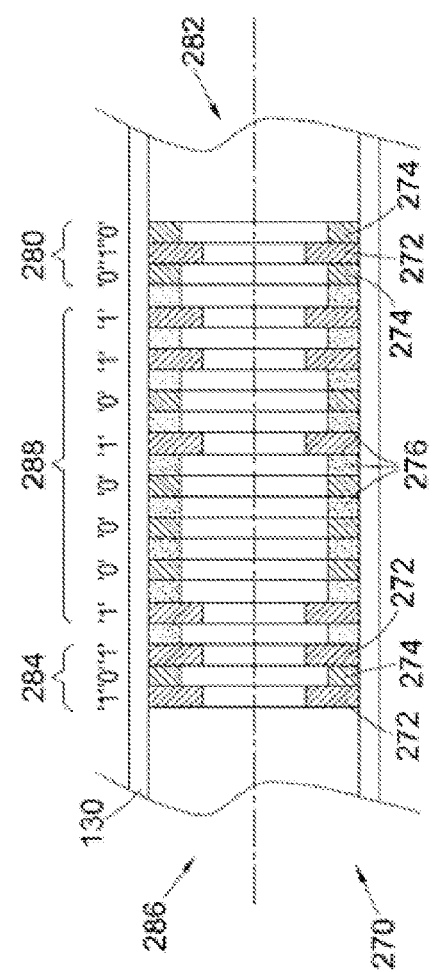

DOWNHOLE DETECTION

CROSS-REFERENCE TO RELATED APPLICATIONS

This application claims priority to United Kingdom Patent Application No. GB1303614.0 filed on Feb. 28, 2013, the contents of which are incorporated herein by reference.

FIELD

The present invention relates to a method and system for downhole detection for use, in particular though not exclusively, for detecting information about a downhole tool in an oil or gas well.

BACKGROUND

Once an oil or gas well has been formed it is common to install completion infrastructure in the well to control production of hydrocarbons fluids from a hydrocarbon-bearing formation surrounding the well to surface. The completion infrastructure may comprise a string of downhole tools joined by a string of production tubing to surface. The downhole tools are generally flow control or circulation devices such as packers, injection sleeves, production sleeves and the like. Such downhole tools are generally activated mechanically using a shifting tool attached to a work string to open, close or otherwise shift the position of sliding sleeves.

Typically a shifting tool is run on a work string through the completion infrastructure to mechanically actuate the various downhole tools in a desired sequence. In order to mechanically actuate a downhole tool, the shifting tool is manipulated (via the work string) from surface. Typically, actuation is achieved by locking the shifting tool onto profiles provided on the downhole tools and performing a combination of the following operations: pulling (work string in tension) pushing (work string in compression), jarring or rotating to deliver the necessary force or impact to the tool with which it is engaged.

As will be appreciated, it can be difficult to accurately control the operations of the shifting tool especially when it is situated at the end of several kilometers of work string and/or the shifting tool is located in a horizontal or highly deviated wellbore. In these situations it is usually not possible to accurately predict at surface whether the intended actuation has been successful. An additional disadvantage of these conventional shifting tools is the difficultly of use. For example, jarring down or slacking off to cause compression of the work string risks that the work string will 'catch' on other downhole tools or land on an unintended component with some force thereby causing damage.

In view of the aforementioned problems with the use of conventional shifting tools, the Applicant developed a method for operating a downhole tool described in co-pending UK patent application no. 1205985.3, in which a work string is first run into a well without actuating any downhole tools. The work string is then used to operate a plurality of downhole tools in a desired sequence as it is pulled out of the well whilst being maintained in tension. This ensures that an operator at surface always has a positive indication of the location of the shifting tool and an accurate log of the operations performed using the shifting tool since every action requires a positive step in order to perform a subsequent operation. Such a system does not, however, provide positive confirmation that the shifting tool has actually actuated or shifted a sliding sleeve of a particular downhole tool. Successful operation of such a system requires an accurate log to be kept of the actuation of all sliding sleeves as the work string is pulled out of the well.

SUMMARY

According to a first aspect of the present invention there is provided a system for use in downhole detection comprising:

a downhole arrangement defining a throughbore;

a tool deployable through the throughbore of the downhole arrangement;

a primary electromagnetic element provided on one of the downhole arrangement and the deployable tool; and a secondary electromagnetic element provided on the other of the downhole arrangement and the deployable tool, wherein the primary and secondary electromagnetic elements are configurable for electromagnetic coupling therebetween.

Such a system may be beneficial for use in determining a degree of electromagnetic coupling between the primary and secondary electromagnetic elements.

The downhole arrangement may comprise a downhole tool.

When used in conjunction with a downhole tool, the system may be beneficial for use in measuring a degree of electromagnetic coupling between the primary and secondary electromagnetic elements and any changes arising therein on actuation and/or de-actuation of the downhole tool. This may provide positive confirmation of a state of the downhole tool before, during and/or after actuation and/or de-actuation of the downhole tool.

The system may be configured to measure any degree of electromagnetic coupling between the primary and secondary electromagnetic elements including the case where the primary and secondary electromagnetic elements are completely uncoupled and the degree of electromagnetic coupling between the primary and secondary electromagnetic elements is zero.

The downhole arrangement may be configurable for at least one of fluid injection, stimulation, fracturing and production.

The deployable tool may comprise a shifting tool for actuating the downhole tool. The primary and secondary electromagnetic elements may be configurable for electromagnetic coupling at a frequency in the range of 10 kHz to 1 MHz, 50 kHz to 500 kHz, or 100 kHz to 150 kHz.

Electromagnetic coupling may be possible in such frequency ranges through any wellbore fluids that may be present between the primary and secondary electromagnetic elements.

The system may comprise a controller which is electrically coupled to the primary electromagnetic element.

The controller may be configured to generate and apply an electrical signal to the primary electromagnetic element.

The controller may be configured to measure an electrical signal existing on the primary electromagnetic element.

The controller may be configured to determine a degree of electromagnetic coupling between the primary and secondary electromagnetic elements from the measured electrical signal.

The controller may be configured to determine a degree of electromagnetic coupling between the primary and secondary electromagnetic elements according to a frequency spectrum of the measured electrical signal.

The controller may be configured to determine a degree of electromagnetic coupling between the primary and secondary electromagnetic elements according to the shape of the frequency spectrum of the measured electrical signal.

The controller may be configured to determine a degree of electromagnetic coupling between the primary and secondary electromagnetic elements according to a resonant feature in the frequency spectrum of the measured electrical signal.

The controller may be configured to determine a degree of electromagnetic coupling between the primary and secondary electromagnetic elements according to a resonant peak or dip in the frequency spectrum of the measured electrical signal.

The controller may be configured to determine a degree of electromagnetic coupling between the primary and secondary electromagnetic elements according to a shape or Q-factor of the resonant feature.

The controller may be configured to determine a degree of electromagnetic coupling between the primary and secondary electromagnetic elements according to a frequency of the resonant feature.

The controller may be configured to log the determined degree of electromagnetic coupling between the primary and secondary electromagnetic elements in a memory.

The deployable tool may comprise the controller.

The downhole arrangement may comprise the controller.

The controller may be configured for communication to surface.

The controller may be located at surface.

The system may comprise a power source for providing power to the controller.

The deployable tool may comprise the power source.

The downhole arrangement may comprise the power source.

The primary electromagnetic element may be provided on the deployable tool and the secondary electromagnetic element may be provided on the downhole arrangement.

A deployable tool which comprises the controller, the power source and the primary electromagnetic element may be used to probe or determine a status of a downhole arrangement such as a downhole tool.

The primary electromagnetic element may comprise a coil of wire, the wire comprising an electrically conductive core surrounded by an electrically insulating outer layer.

The coil of wire may be arranged helically around a body portion of the deployable tool. Such an orientation of the coil of wire may be accommodated on the deployable tool without unduly increasing the radial extent of the deployable tool.

The wire may comprise a copper core.

The primary electromagnetic element may be encapsulated in a potting compound. Encapsulation of the primary electromagnetic element may provide protection for the primary electromagnetic element from an environment surrounding the primary electromagnetic element.

The deployable tool may comprise a primary enclosure.

The primary electromagnetic element may be housed within the primary enclosure. The primary enclosure may provide mechanical protection for the primary electromagnetic element.

The primary enclosure may be filled with the potting compound. Filling the primary enclosure with a potting compound may provide support for the primary enclosure and provide enhanced environmental and mechanical protection for the primary electromagnetic element.

The potting compound may comprise an epoxy or an elastomeric compound.

The primary enclosure may comprise a generally tubular base member and a generally tubular lid member.

The primary electromagnetic element may be wrapped around the base member.

At least the lid member of the primary enclosure may be transparent to an electromagnetic field at a frequency in the range of 10 kHz to 1 MHz, 50 kHz to 500 kHz, or 100 kHz to 150 kHz.

The primary enclosure may comprise a polyether ether ketone (PEEK) material. As well as being relatively transparent to an electromagnetic field in the frequency range of the electromagnetic field, PEEK is a relatively inert material and may be formed and/or machined.

The coil of wire may extend helically around an axis arranged radially relative to a longitudinal axis of the deployable tool. Such an orientation of the coil of wire may serve to generate a magnetic field which is directed radially outward towards the secondary electromagnetic element of the downhole arrangement. This may serve to enhance any electromagnetic coupling between the primary and secondary electromagnetic elements.

The deployable tool may comprise a plurality of primary electromagnetic elements.

Each of the plurality of primary electromagnetic elements may permit a degree of electromagnetic coupling between the primary and secondary electromagnetic elements to be measured. As such, the plurality of primary electromagnetic elements may permit repeated measurement of any electromagnetic coupling between the primary and secondary electromagnetic elements. This may improve accuracy and/or confidence in the measurement of a degree of electromagnetic coupling between the primary and secondary electromagnetic elements. A plurality of primary electromagnetic elements may also provide one or more spare primary electromagnetic elements which may be relied upon in the event of failure of one of the primary electromagnetic elements.

The primary electromagnetic element may comprise a plurality of coils of wire, wherein the wire of each coil comprises an electrically conductive core surrounded by an electrically insulating outer layer.

Each coil of wire may extend helically around a body portion of the deployable tool.

Each coil of wire may be axially distributed along the body portion of the deployable tool.

Each coil of wire may extend helically around a different axis, each axis arranged along a different radial direction relative to a longitudinal axis of the deployable tool.

The plurality of primary electromagnetic elements may be connected electrically in series.

The plurality of primary electromagnetic elements may be connected electrically in parallel.

The plurality of primary electromagnetic elements may be electrically unconnected. Each of the primary electromagnetic elements may be independently coupled to the controller. The controller may be configured to measure an electrical signal existing on each of the primary electromagnetic elements. The controller may be configured to determine a degree of electromagnetic coupling between each of the primary electromagnetic elements and the secondary electromagnetic element from the measured electrical signals. Such a plurality of primary electromagnetic elements may permit circumferential discrimination of any electromagnetic coupling between the primary and secondary electromagnetic elements.

The deployable tool may comprise a further secondary electromagnetic element which is independent of the primary electromagnetic element. The further secondary electromagnetic element of the deployable tool may be coupled to the controller. The controller may be configured to measure an electrical signal existing on the further secondary electromagnetic element of the deployable tool. The controller may be configured to determine a degree of any electromagnetic coupling between the secondary electromagnetic element of the downhole arrangement and the further secondary electromagnetic element of the deployable tool. Such a further secondary electromagnetic element of the deployable tool may at least partially isolate the electrical signal existing on the further secondary electromagnetic element from the electrical signal applied by the controller to the primary electromagnetic element.

The secondary electromagnetic element may extend around the throughbore of the downhole arrangement. This may enhance the strength of any electromagnetic coupling between the primary and secondary electromagnetic elements.

The secondary electromagnetic element may comprise a coil of wire arranged helically about the throughbore of the downhole arrangement, wherein the wire comprises an electrically conductive core surrounded by an electrically insulating outer layer.

The core of the wire may comprise copper.

The secondary electromagnetic element may comprise a capacitor electrically connected between two ends of the wire core.

The secondary electromagnetic element may be encapsulated in a potting compound.

The downhole arrangement may comprise a secondary enclosure.

The secondary electromagnetic element may be housed within the secondary enclosure.

The secondary enclosure may be filled with the potting compound.

The potting compound may comprise an epoxy or a elastomeric compound.

The secondary enclosure may comprise a generally tubular base member and a generally tubular lid member. The base member and the lid member may define a generally annular cavity therebetween. The radial extent of the annular cavity may be selected so as to avoid electromagnetic coupling between the secondary electromagnetic element and a body portion of the downhole arrangement. Such electromagnetic coupling may alter any electromagnetic coupling between the primary and secondary electromagnetic elements. This may make measurement of a degree of electromagnetic coupling between the primary and secondary electromagnetic elements from the frequency spectrum of the measured electrical signal more difficult.

The secondary electromagnetic element may be wrapped around the base member.

At least the base member of the secondary enclosure may be transparent to an electromagnetic field at a frequency in the range of 10 kHz to 1 MHz, 50 kHz to 500 kHz, or 100 kHz to 150 kHz.

The secondary enclosure may comprise a polyether ether ketone (PEEK) material.

The coil of wire may extend helically around an axis arranged perpendicular to a longitudinal axis of the downhole arrangement.

The secondary electromagnetic element may comprise a plurality of coils of wire, wherein the wire of each coil of wire comprises an electrically conductive core surrounded by an electrically insulating outer layer.

Each coil of wire may extend helically around the throughbore of the downhole arrangement.

Each coil of wire may extend helically around an axis arranged perpendicular to a longitudinal axis of the downhole arrangement.

The plurality of coils of wire may be connected electrically in series.

The plurality of coils of wire may be connected electrically in parallel.

Each coil of wire may be unconnected electrically to the other coils of wire.

Each coil of wire may be configured such that electromagnetic coupling of each coil with the primary electromagnetic element provides a corresponding measured electrical signal having a characteristic frequency spectrum. In other words, each coil of wire may be configured so as to have a characteristic frequency response. The resulting series of frequency responses may be used to encode information. For example, such an arrangement may permit a number to be encoded as a series of different frequency responses. Such a number may, for example, be used to uniquely identify the downhole arrangement. Where the downhole arrangement is located in a wellbore and a position along the wellbore of the primary electromagnetic element is monitored as the primary electromagnetic element is run past the secondary electromagnetic element, this may permit the position of the secondary electromagnetic element within the wellbore to be determined. This may permit a position of the downhole arrangement within the wellbore to be determined. For example, this may permit a depth of the downhole arrangement within the wellbore to be determined.

The plurality of coils of wire may be distributed axially along the downhole arrangement. A further plurality of coils of wire defining a different series of frequency responses may be used to uniquely identify a further downhole arrangement in the same workstring as the downhole arrangement.

The secondary electromagnetic element may comprise a ring extending around the throughbore of the downhole arrangement.

The ring may be electrically conductive.

The ring may comprise a metal.

The ring may be defined by an annular portion of the downhole arrangement.

The secondary electromagnetic element may be configured so as to have a predetermined frequency response over a frequency range of the electromagnetic field.

The secondary electromagnetic element may be configured so that an electrical signal existing on the primary electromagnetic element when the primary and secondary electromagnetic elements are electromagnetically coupled has a predetermined frequency spectrum over a frequency range of the electromagnetic field.

The predetermined frequency spectrum may have a predetermined shape.

The predetermined frequency spectrum may include a resonant feature having a predetermined shape.

The resonant feature may comprise a resonant peak or dip.

The resonant feature may have a predetermined Q-factor.

The resonant feature may have a predetermined resonant frequency.

The predetermined resonant frequency may be predetermined for a given temperature and/or pressure to which the secondary electromagnetic element is exposed.

The secondary electromagnetic element may comprise a plurality of rings distributed axially along a longitudinal axis of the downhole arrangement, each ring extending around the throughbore of the downhole arrangement.

The rings may be arranged axially adjacent to one another.

Each ring may be configured such that electromagnetic coupling of each ring with the primary electromagnetic element provides a corresponding measured electrical signal having a characteristic frequency spectrum. In other words, each ring may have a corresponding characteristic frequency response.

Each ring may be configured such that electromagnetic coupling of each ring with the primary electromagnetic element provides a corresponding measured electrical signal having a characteristic frequency spectrum over a frequency range of the electromagnetic field.

The configuration of each ring may be selected from a finite set of different ring configurations. Each ring configuration may have a corresponding characteristic frequency response. This may permit a ring configuration to be determined from the measurement of the frequency response.

Each characteristic frequency response may be associated with a different symbol of a code. Accordingly, each ring configuration may be associated with or may represent a different symbol of a code. The plurality of frequency responses associated with the plurality of rings may define the code.

The code may, for example, define a number such as a unique identification number for the downhole arrangement. Where the downhole arrangement is located in a wellbore and a position along the wellbore of the primary electromagnetic element is monitored as the primary electromagnetic element is run past the secondary electromagnetic element, this may permit the position of the secondary electromagnetic element within the wellbore to be determined. This may permit a position of the downhole arrangement within the wellbore to be determined. For example, this may permit a depth of the downhole arrangement within the wellbore to be determined.

Each ring configuration may be defined at least in part by an inner profile of the ring.

Each ring configuration may be defined at least in part by a material from which the ring is formed.

Each ring configuration may be defined at least in part by an axial extent of the ring.

The finite set of ring configurations may comprise a first ring configuration and a second ring configuration.

The first ring configuration may represent a first symbol of a binary code and the second ring configuration may represent a second symbol of the binary code.

The finite set of ring configurations may comprise a plurality of data ring configurations and a checking ring configuration which is different from the data ring configurations. A ring configured according to the checking ring configuration may have an inner diameter which is different to the inner diameter of a ring configured according to any of the data ring configurations. A ring configured according to the checking ring configuration may be formed from an electrically insulating material and a ring configured according to a data ring configuration may be formed from an electrically conductive material. A ring configured according to the checking ring configuration may have a different axial extent to a ring configured according to a data ring configuration.

The plurality of rings may define a series of rings in which a checking ring is included repeatedly. In such a series of rings, the repeated appearance of a checking ring may enable a checking function to be performed in which the series of frequency responses corresponding to the series of ring configurations is checked to ascertain whether the frequency response corresponding to the checking ring configuration is measured in the correct repeating series. This may permit a series of readings obtained while the primary electromagnetic element is stationary relative to the series of rings to be distinguished from a series of readings obtained as the primary electromagnetic element is run past the series of rings.

The plurality of rings may define a series of rings in which a checking ring is included with a regular axial periodicity.

Alternate rings in the series of rings may be checking rings.

The plurality of rings may define a series of rings which are configured to permit a change in a direction of the primary electromagnetic element relative to the secondary electromagnetic element to be determined when the primary electromagnetic element is located adjacent to the secondary electromagnetic element. For example, the plurality of rings may define a series of rings in which a series of ring configurations is repeated at least once. This may also provide a way of checking the accuracy of a series of frequency responses obtained from a series of rings. This may provide a more reliable code detection method and/or provide greater confidence in the code detection method.

The secondary electromagnetic element may comprise an axially inner plurality of rings, a first axially outer plurality of rings, and a second axially outer plurality of rings.

The series of ring configurations of the first axially outer plurality of rings may be different to the series of ring configurations of the axially inner plurality of rings and the second axially outer plurality of rings.

The series of ring configurations of the second axially outer plurality of rings may be different to the series of ring configurations of the axially inner plurality of rings and the first axially outer plurality of rings.

One of the series of ring configurations of the first and second axially outer plurality of rings may define a unique start code and the other may define a unique end code. This may permit the code extracted from reading the axially inner plurality of rings to be interpreted as data. The use of such start and end codes may serve to avoid false readings.

The downhole arrangement may be configurable between a first configuration in which electromagnetic coupling between the primary and secondary electromagnetic elements is prevented and a second configuration in which the secondary electromagnetic element is accessible by an electromagnetic field generated by the primary electromagnetic element.

The downhole arrangement may be configurable between the first and second configurations on actuation or de-actuation of the downhole arrangement. Thus, determining a degree of electromagnetic coupling between the primary and secondary electromagnetic elements may provide a positive indication of actuation or de-actuation of the downhole arrangement.

The downhole arrangement may comprise a cover member.

The cover member may comprise a cover sleeve.

The secondary electromagnetic element may be arranged radially outwardly of the cover sleeve relative to a longitudinal axis of the throughbore of the downhole arrangement.

The secondary electromagnetic element and the cover member may be moveable relative to one another.

The cover member may extend at least partially between the secondary electromagnetic element and the throughbore of the downhole arrangement in the first configuration and the cover member may be at least partially withdrawn from between the secondary electromagnetic element and the throughbore of the downhole arrangement in the second configuration.

The secondary electromagnetic element may be attached to a body portion of the downhole arrangement and the cover member may be slideable relative to the body portion on actuation or de-actuation of the downhole arrangement.

The cover member may be attached to a body portion of the downhole arrangement and the secondary electromagnetic element may be slideable relative to the body portion on actuation or de-actuation of the downhole arrangement.

The secondary electromagnetic element may be accessible for electromagnetic coupling with the primary electromagnetic element regardless of a status of the downhole arrangement. The presence of such a secondary electromagnetic element may permit identification of the downhole arrangement regardless of whether the downhole arrangement is in an actuated or a de-actuated state.

The downhole arrangement may comprise a further secondary electromagnetic element for electromagnetic coupling with the primary electromagnetic element.

The further secondary electromagnetic element may comprise one or more of the same features of which the secondary electromagnetic element may comprise.

The further secondary electromagnetic element may be accessible for electromagnetic coupling with the primary electromagnetic element regardless of a status of the downhole arrangement. The presence of such a further secondary electromagnetic element may permit identification of the downhole arrangement regardless of whether the downhole arrangement is in an actuated or a de-actuated state.

The further secondary electromagnetic element may be configured for location downhole of the secondary electromagnetic element. This may permit the primary electromagnetic element of the deployable tool to detect the further secondary electromagnetic element before it detects the secondary electromagnetic element as the deployable tool is pulled uphole from a position downhole of the further secondary electromagnetic element. If the further secondary electromagnetic element is accessible for electromagnetic coupling with the primary electromagnetic element regardless of a status of the downhole arrangement, this may permit the deployable tool to identify the downhole arrangement via electromagnetic coupling between the primary and further secondary electromagnetic elements and then check the status of the downhole arrangement via electromagnetic coupling between the primary and secondary electromagnetic elements.

It should be understood that the optional features defined in relation to one aspect may apply alone or in any combination in relation to a different aspect.

According to a second aspect of the present invention there is provided a downhole arrangement for use in downhole detection, the downhole arrangement defining a throughbore for deployment of a deployable tool therethrough and the downhole arrangement comprising an electromagnetic element configurable for electromagnetic coupling with a further electromagnetic element provided on the deployable tool.

The downhole arrangement may comprise a downhole tool which is configurable to perform a wellbore operation.

The downhole arrangement may be configurable for at least one of fluid injection, stimulation, fracturing and production.

It should be understood that the optional features defined in relation to one aspect may apply alone or in any combination in relation to a different aspect.

According to a third aspect of the present invention there is provided a tool for use in downhole detection, the tool being deployable through a throughbore defined by a downhole arrangement and the deployable tool comprising an electromagnetic element configurable for electromagnetic coupling with a further electromagnetic element provided on the downhole arrangement.

It should be understood that the optional features defined in relation to one aspect may apply alone or in any combination in relation to a different aspect.

According to a fourth aspect of the present invention there is provided a method for use in downhole detection, the method comprising: providing a primary electromagnetic element on one of a downhole arrangement and a tool deployable within a throughbore of the downhole arrangement;

providing a secondary electromagnetic element on the other of the downhole arrangement and the deployable tool, wherein the primary and secondary electromagnetic elements are configurable for electromagnetic coupling therebetween; and aligning the primary and secondary electromagnetic elements.

The method may comprise measuring an electrical signal existing on the primary electromagnetic element.

The method may comprise determining a degree of electromagnetic coupling between the primary and secondary electromagnetic elements from the measured electrical signal.

The method may comprise logging a determining degree of electromagnetic coupling between the primary and secondary electromagnetic elements in a memory provided on one of the downhole arrangement and the deployable tool.

The method may comprise communicating a determining degree of electromagnetic coupling between the primary and secondary electromagnetic elements from one of the downhole arrangement and the deployable tool to the other.

The method may comprise communicating a determining degree of electromagnetic coupling between the primary and secondary electromagnetic elements from one of the downhole arrangement and the deployable tool to surface.

The method may comprise preventing any electromagnetic coupling between the primary and secondary electromagnetic elements and then, in response to actuation or de-actuation of the downhole arrangement, allowing any electromagnetic coupling between the primary and secondary electromagnetic elements.

The method may comprise allowing any electromagnetic coupling between the primary and secondary electromagnetic elements and then, in response to actuation or de-actuation of the downhole arrangement, preventing any electromagnetic coupling between the primary and secondary electromagnetic elements.

Preventing electromagnetic coupling between the primary and secondary electromagnetic elements may comprise at least partially covering the secondary electromagnetic element using a cover member that extends at least partially between the primary and secondary electromagnetic elements.

The method may comprise providing the primary electromagnetic element on the deployable tool.

The method may comprise providing the secondary electromagnetic element on the downhole arrangement.

The method may comprise providing a further secondary electromagnetic element on the downhole arrangement.

The method may comprise providing the further secondary electromagnetic element on the downhole arrangement downhole of the secondary electromagnetic element.

The further secondary electromagnetic element may be accessible for electromagnetic coupling with the primary electromagnetic element regardless of a status of the downhole arrangement.

The method may comprise running the primary electromagnetic element past the further secondary electromagnetic element.

The method may comprise running the primary electromagnetic element from a position downhole of the further secondary electromagnetic element uphole past the further secondary electromagnetic element.

The method may comprise monitoring an electrical signal existing on the primary electromagnetic element as the primary electromagnetic element is run past the further secondary electromagnetic element.

The further secondary electromagnetic element may comprise a series of rings, each ring having a corresponding ring configuration selected from a finite set of ring configurations. The set of finite ring configurations may include a plurality of data ring configurations and a checking ring configuration which is different to the data ring configurations. A checking ring having the checking ring configuration may be included repeatedly in the series of rings.

The method may comprise using the series of rings to encode a number.

The method may comprise using the series of rings to encode an identification number for the downhole arrangement.

The method may comprise associating the series of rings with the downhole arrangement.

The method may comprise determining a series of frequency spectra of the monitored electrical signal as the primary electromagnetic element is run past each ring of the series of rings.

The method may comprise checking the series of frequency spectra to ascertain whether the frequency spectra corresponding to the checking ring configuration is detected in the correct repeating series. This may permit a series of readings obtained while the primary electromagnetic element is stationary relative to the series of rings to be distinguished from a series of readings obtained as the primary electromagnetic element is run past the series of rings.

The method may comprise determining the identification number for the downhole arrangement from the determined series of frequency spectra. This may permit the downhole arrangement to be identified.

The downhole arrangement may be located in a wellbore.

The method may comprise monitoring a position along the wellbore of the primary electromagnetic element as the primary electromagnetic element is run past the secondary electromagnetic element. This may permit the position of the secondary electromagnetic element within the wellbore to be determined. This may permit a position of the downhole arrangement within the wellbore to be determined. For example, this may permit a depth of the downhole arrangement within the wellbore to be determined.

The method may comprise actuating or de-actuating the downhole arrangement according to the determined identification number.

The method may comprise running the primary electromagnetic element past the secondary electromagnetic element.

The method may comprise monitoring an electrical signal existing on the primary electromagnetic element as the primary electromagnetic element is run past the secondary electromagnetic element.

The method may comprise determining a series of frequency spectra of the monitored electrical signal as the primary electromagnetic element is run past the secondary electromagnetic element.

The method may comprise determining a status of the downhole arrangement from the determined series of frequency spectra determined as the primary electromagnetic element is run past the secondary electromagnetic element.

It should be understood that the optional features defined in relation to one aspect may apply alone or in any combination in relation to a different aspect.

According to a fifth aspect of the present invention there is provided a method for use in determining a status of a downhole tool, comprising: providing a primary electromagnetic element on a shifting tool deployable within a throughbore of the downhole tool;

providing a secondary electromagnetic element on the downhole tool; applying an electrical signal to the primary electromagnetic element; aligning the primary electromagnetic element with the secondary electromagnetic element;

measuring an electrical signal existing on the primary electromagnetic element; and determining a degree of electromagnetic coupling between the primary and secondary electromagnetic elements from the measured electrical signal.

The method may comprise preventing any electromagnetic coupling between the primary and secondary electromagnetic elements and then, in response to actuation or de-actuation of the downhole arrangement, allowing any electromagnetic coupling between the primary and secondary electromagnetic elements.

The method may comprise allowing any electromagnetic coupling between the primary and secondary electromagnetic elements and then, in response to actuation or de-actuation of the downhole arrangement, preventing any electromagnetic coupling between the primary and secondary electromagnetic elements.

It should be understood that the optional features defined in relation to one aspect may apply alone or in any combination in relation to a different aspect.

According to a sixth aspect of the present invention there is provided a method for identifying a downhole tool, comprising:

providing a primary electromagnetic element on a shifting tool deployable within a throughbore of the downhole tool;

providing a secondary electromagnetic element on the downhole tool;

applying an electrical signal to the primary electromagnetic element;

running the primary electromagnetic element past the secondary electromagnetic element;

monitoring an electrical signal existing on the primary electromagnetic element as the primary electromagnetic element is run past the secondary electromagnetic element; and determining an identity of the downhole tool from the monitored electrical signal.

It should be understood that the optional features defined in relation to one aspect may apply alone or in any combination in relation to a different aspect.

According to a seventh aspect of the present invention there is provided a system for use in downhole detection comprising:

a first part defining a throughbore;

a second part deployable through the throughbore;

a primary electromagnetic element provided on one of the first and second parts; and a secondary electromagnetic element provided on the other of the first and second parts, wherein the primary and secondary electromagnetic elements are configurable to be coupled.

The first part may comprise a downhole arrangement.

The first part may comprise a downhole tool which is configurable to perform a wellbore operation.

The first part may be configurable for at least one of fluid injection, stimulation, fracturing and production.

The second part may comprise a deployable tool.

The second part may comprise a shifting tool.

It should be understood that the optional features defined in relation to one aspect may apply alone or in any combination in relation to a different aspect.

According to an eighth aspect of the present invention there is provided a first part for use in downhole detection, the first part defining a throughbore for deployment of a second part therethrough and the first part comprising an electromagnetic element configurable to be coupled to a further electromagnetic element provided on the second part.

It should be understood that the optional features defined in relation to one aspect may apply alone or in any combination in relation to a different aspect.

According to an ninth aspect of the present invention there is provided a second part for use in downhole detection, the second part being deployable through a throughbore defined by a first part and the second part comprising an electromagnetic element configurable to be coupled to a further electromagnetic element provided on the first part.

It should be understood that the optional features defined in relation to one aspect may apply alone or in any combination in relation to a different aspect.

BRIEF DESCRIPTION OF THE DRAWINGS

The present invention will be further described by way of non-limiting example only with reference to the following drawings of which:

FIG. 1(a) is a schematic of a system for use in downhole detection prior to actuation of a downhole arrangement;

FIG. 1(b) is a schematic of the system of FIG. 1(a) after actuation of the downhole arrangement;

FIG. 2(a) is an end elevation of a primary enclosure for a primary electromagnetic element of the system of FIG. 1(a);

FIG. 2(b) is a longitudinal cross-section on AA of the primary enclosure of FIG. 2(a);

FIG. 4(a) shows frequency response traces measured without any electromagnetic coupling between primary and secondary electromagnetic elements of the system of FIG. 1(a);

FIG. 4(b) shows frequency response traces measured when the primary and secondary electromagnetic elements of the system of FIG. 1(a) are electromagnetically coupled;

FIG. 5(a) is a schematic of a further system for use in downhole detection during identification of a downhole arrangement but prior to actuation of the downhole arrangement;

FIG. 5(b) is a schematic of the further system of FIG. 5(a) after identification of the downhole arrangement but prior to actuation of the downhole arrangement;

FIG. 5(c) is a schematic of the further system of FIG. 5(a) after actuation of the downhole arrangement;

FIG. 6(a) is a schematic of a further secondary electromagnetic element of the system of FIG. 5(a); and FIG. 6(b) is a schematic of an alternative further secondary electromagnetic element of the system of FIG. 5(a).

DETAILED DESCRIPTION OF THE DRAWINGS

Figure 3:
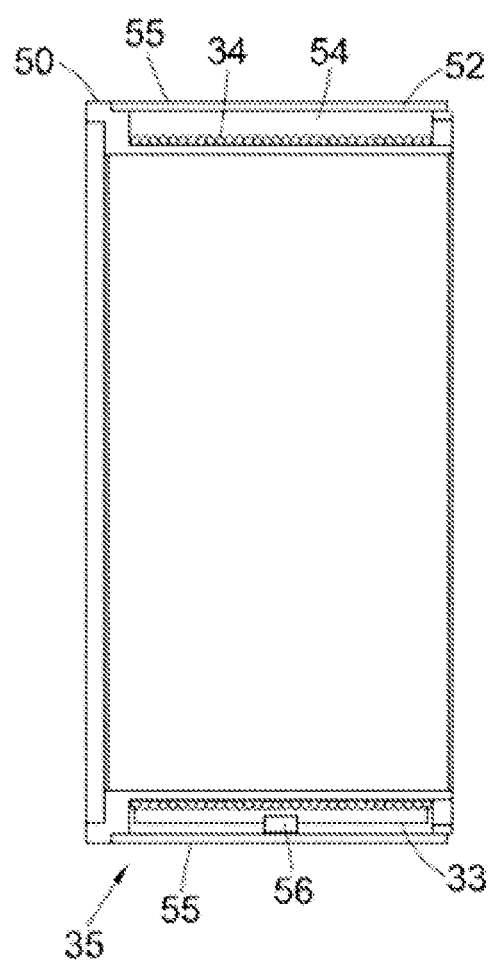
FIG. 3 is a longitudinal cross-section of a secondary enclosure for a secondary electromagnetic element of the system of FIG. 1(a)

Terms such as "up", "down", "upward", "downward", "uphole", "downhole" and the like are used in the following description of the drawings for ease of illustration only. One skilled in the art will understand that such terms are intended to refer to the particular orientation of the features shown in drawings, but are not intended to be limiting. For example, terms such as "up", "upward" and "uphole" may be used to refer to a direction along a borehole towards a point of entry of the borehole into the ground or the seabed, whilst terms such as "down", "downward" and "downhole" may be used to refer to a direction along a borehole away from the point of entry. As such, when a borehole is deviated from the vertical or is horizontal, such terms may refer to a direction which differs significantly from a vertical direction and may even refer to a horizontal direction.

Referring initially to FIG. 1(a) there is shown a system for downhole detection generally designated 10 installed within a wellbore 12. The wellbore 12 may comprise a borehole wall of an open hole section of an oil or gas well or may comprise a liner or a casing installed within an oil or gas well. The system 10 comprises a deployable tool in the form of a shifting tool generally designated 14 deployed within a through bore 16 of a downhole arrangement in the form of a downhole tool generally designated 18. The downhole tool 18 may be configured for at least one of injection, stimulation, fracturing and production. It should, however, be understood that the system 10 of FIG. 1(a) is not limited to use in such downhole operations, but may be used in other downhole operations.

The shifting tool 14 comprises a generally tubular body 20, a primary electromagnetic element in the form of a primary coil 22 housed within a generally annular primary enclosure 23, a controller 24 and a power source 26. The power source 26 is connected to the controller 24 for the provision of power thereto. The controller 24 is connected to the primary coil 22 for the application of an electrical signal thereto as will be described in more detail below.

The downhole tool 18 comprises a generally tubular body 30 which defines the through bore 16, a cover sleeve 32 which is slideable relative to the tubular body 30, and a secondary electromagnetic element in the form of a secondary coil 34 housed within a generally annular secondary enclosure 35. The cover sleeve 32 is arranged radially inward of the secondary coil 34 relative to a longitudinal axis 36 of the downhole tool 18. The downhole tool 18 is configured so that the cover sleeve 32 slides relative to the tubular body 30 of the downhole tool 18 in response to actuation of the downhole tool 18.

FIGS. 2(a) and 2(b) show the primary coil 22 housed within the primary enclosure 23. The primary enclosure 23 is formed from a polyether ether ketone (PEEK) material. The primary enclosure 23 comprises a generally tubular base member 40 and a tubular lid member 42. The base member 40 defines an annular recess 44 in an outer surface 48 thereof. The primary coil 22 is wrapped around the base member 40 within the recess 42. The primary coil 22 is encapsulated in an epoxy potting compound (not shown) for environmental protection. The lid member 42 is configured to fit around the outer surface 48 of the base member 40 so as to define an annular cavity 49 which encloses the primary coil 22. The cavity 49 is filled with the epoxy potting compound (not shown) so as to provide mechanical support to the primary enclosure 23 and so as to enhance environmental protection of the primary coil 22.

FIG. 3 shows the secondary coil 34 housed within the secondary enclosure 35. The secondary enclosure 35 is formed from a polyether ether ketone (PEEK) material. The secondary enclosure 35 comprises a generally tubular base member 50 and a tubular lid member 52 which co-operate so as to define a generally annular cavity 54. The secondary coil 34 is wrapped around the base member 40 within the cavity 54. The secondary enclosure 35 is configured so as to provide a radial separation between the secondary coil 34 and an outer surface 55 of the lid member 52. Such a radial separation may serve to reduce any electromagnetic coupling between the secondary coil 34 and the body 30 of the downhole tool 18. The secondary coil 34 is encapsulated in an epoxy potting compound (not shown) for environmental protection. The cavity 54 is filled with the epoxy potting compound (not shown) so as to provide mechanical support to the secondary enclosure 35 and so as to enhance environmental protection of the secondary coil 34.

In use, the shifting tool 14 is deployed downwardly through the through bore 16 defined by the downhole tool 18 until the shifting tool 14 is located downhole from the downhole tool 18. The controller 24 generates and applies an alternating current (AC) electrical signal to the primary coil 22 and measures an electrical signal existing on the primary coil 22. The controller 24 repeatedly sweeps the frequency of the applied electrical signal from 100 kHz to 150 kHz and monitors the measured electrical signal as the shifting tool 14 is pulled uphole from a position in which the primary coil 22 is located downhole from the secondary coil 34.

Prior to actuation of the downhole tool 18 as shown in FIG. 1(a), the cover sleeve 32 extends between the secondary coil 34 and the longitudinal axis 36 so as to cover the secondary coil 34. Accordingly, electromagnetic coupling between the primary and secondary coils 22, 34 is prevented by the cover sleeve 32 prior to actuation of the downhole tool 18. The corresponding measured electrical signal in the absence of any electromagnetic coupling between the primary and secondary coils 22, 34 is shown in the upper trace in FIG. 4(a) and the corresponding magnitude frequency spectrum of the measured electrical signal is shown in the lower trace of FIG. 4(a). As shown in FIG. 4(a), the magnitude frequency spectrum of the measured electrical signal in the absence of any electromagnetic coupling between the primary and secondary coils 22, 34 decreases as the frequency of the applied electrical signal is swept from 100 kHz to 150 kHz. The controller 24 is configured to interpret detection of such a frequency spectrum of the measured electrical signal as an indication that the downhole tool 18 is in a de-actuated state.

After actuation of the downhole tool 18 as shown in FIG. 1(b), the cover sleeve 32 is withdrawn from between the secondary coil 34 and the longitudinal axis 36 so as to reveal or provide access to the secondary coil 34 from the throughbore 16. Accordingly, after actuation of the downhole tool 18 electromagnetic coupling between the primary and secondary coils 22, 34 may occur when the primary and secondary coils 22, 34 are axially aligned as shown in FIG. 1(b). The corresponding electrical signal measured when the primary and secondary coils 22, 34 are electromagnetically coupled is shown in the upper trace in FIG. 4(b) and the corresponding magnitude frequency spectrum of the measured electrical signal is shown in the lower trace of FIG. 4(b). As shown in FIG. 4(b), the magnitude frequency spectrum of the measured electrical signal when the primary and secondary coils 22, 34 are electromagnetically coupled displays a resonant peak close to a frequency of 125 kHz at the centre of the swept frequency range of 100 kHz to 150 kHz. The controller 24 is configured to interpret detection of such a resonant peak in the frequency spectrum of the measured electrical signal as an indication that the downhole tool 18 is in an actuated state.

In view of the foregoing description, the system 10 may be used to determine the status of the downhole tool 18. The controller 24 may log the determined status of the downhole tool 18 for analysis after recovery of the shifting tool 14 to surface. Additionally or alternatively, the controller 24 may comprise a transmitter (not shown) for transmission of the determined status to a surface receiver, for example via an electric line which connects the shifting tool 14 to surface.

With reference now to FIG. 5, there is shown a further system for downhole detection generally designated 110. The system 110 and the system 10 comprise many like features, and, as such, like features are identified with like reference numerals. The system 110 comprises a deployable tool in the form of a shifting tool generally designated 114 deployed within a through bore 116 of a downhole arrangement in the form of a downhole tool generally designated 118. The shifting tool 114 comprises a generally tubular body 120, a primary electromagnetic element in the form of a primary coil 122 housed within a generally annular primary enclosure 123, a controller 124 and a power source 126. The power source 126 is connected to the controller 124 for the provision of power thereto. The controller 124 is connected to the primary coil 122 for the application of an electrical signal thereto as will be described in more detail below.

The downhole tool 118 comprises a generally tubular body 130 which defines the through bore 116, a cover sleeve 132 which is slideable relative to the tubular body 130, and a secondary electromagnetic element in the form of a secondary coil 134 housed within a generally annular secondary enclosure 135. The cover sleeve 132 is arranged radially inward of the secondary coil 134 relative to a longitudinal axis 136 of the downhole tool 118. The downhole tool 118 is configured so that the cover sleeve 132 slides relative to the tubular body 130 of the downhole tool 118 in response to actuation of the downhole tool 118.

Unlike the downhole tool 18, the downhole tool 118 further comprises a further secondary electromagnetic element in the form of a ring arrangement generally designated 170. The ring arrangement 170 is located downhole of the secondary coil 134 and is shown in detail in FIG. 6(a). The ring arrangement 170 comprises a series of rings, each ring having a first configuration, a second configuration or a checking configuration. In FIG. 6(a), rings configured according to the first configuration are identified by reference numeral 172, rings configured according to the second configuration are identified by reference numeral 174 and rings configured according to the checking configuration are identified by reference numeral 176. The rings 172, 174 and 176 have the same inner diameter. The rings 172, 174 and 176 have the same outer diameter.

Rings 172, 174 of the first and second configurations are formed from steel. A checking ring 176 is formed from an electrically insulating material such as PEEK and or an elastomeric material. Rings 172 of the first configuration have an axial extent which is twice the axial extent of the rings 174 of the second configuration. The checking rings 176 have the same axial extent as the rings of the second configuration 174.

The ring arrangement 170 comprises a first axially outer series of rings 180 at a downhole end 182 of the ring arrangement 170, a second axially outer series of rings 184 at an uphole end 186 of the ring arrangement 170, and an axially inner series of rings 188 located axially intermediate the first and second axially outer series of rings 180, 184. In order of appearance from the downhole end 182 of the ring arrangement 170, the first axially outer series of rings 180 comprises a ring 174, a ring 172 and a ring 174. As will be described in more detail below, the first axially outer series of rings 180 may serve to indicate a start or downhole end of the axially inner series of rings 188.

In the axially inner series of rings 188, alternate rings are checking rings 176 and each checking ring 176 is intermediate a ring 172 or a ring 174. As will be described in more detail below, the rings 172, 174 of the series of rings 188 define a binary code.

In order of appearance from the downhole end 182 of the ring arrangement 170, the second axially outer series of rings 184 comprises a ring 172, a ring 174 and a ring 172. As will be described in more detail below, the second axially outer series of rings 184 may serve to indicate an uphole end of the axially inner series of rings 188.

In use, the controller 124 generates and applies an alternating current (AC) electrical signal to the primary coil 122 and measures an electrical signal existing on the primary coil 122. The controller 124 repeatedly sweeps the frequency of the applied electrical signal from 100 kHz to 150 kHz and monitors the measured electrical signal as the shifting tool 114 is pulled uphole from a position in which the primary coil 122 is located downhole from the ring arrangement 170.

As the primary coil 122 passes the ring arrangement 170, the controller 124 repeatedly measures a frequency spectrum of the measured electrical signal. The first, second and checking configurations are designed such that rings configured according to different configurations provide different characteristic frequency spectra. The different characteristic frequency spectra may, for example, differ in shape. The different characteristic frequency spectra may have different spectral features. The different spectral features may, for example, have a different frequency. The different characteristic frequency spectra may have different resonant features. The different characteristic frequency spectra may have resonant features of a different shape. The different characteristic frequency spectra may have resonant features having a different Q-factor or the like.

The controller 124 is configured so as to identify the characteristic frequency spectrum of a ring 172 as a first binary symbol or a '1', and to identify the characteristic frequency spectrum of a ring 174 as a second binary symbol or a '0'. As the primary coil 122 passes the first axially outer series of rings 180, the controller 124 detects a code of '010'. The controller 124 treats the subsequent frequency spectra of the measured electrical signal for each of the rings of the axially inner series of rings 188 as symbols of a code until the primary coil 122 passes the second axially outer series of rings 184 and the controller 124 detects a code of '101'. The repeated appearance of a checking ring 176 enables the controller 124 to perform a checking function in which the series of frequency spectra of the measured electrical signal is checked to ascertain whether the frequency spectrum of the measured electrical signal corresponding to the checking rings 176 is detected in the correct repeating sequence. This may permit a series of readings obtained while the primary coil 122 is stationary relative to the ring arrangement 170 to be distinguished from a series of readings obtained as the primary coil 122 is run past the ring arrangement 170.

The code defined by the rings of the axially inner series of rings 188 may define a unique identification number for the downhole tool 118. Once the controller 124 has determined the code defined by the rings of the axially inner series of rings 188, the controller 124 may actuate the downhole tool 118. The secondary coil 134 may subsequently be used to determine whether the downhole tool 118 has been successfully actuated. Additionally or alternatively, the controller 124 may log the determined code or transmit the same to a surface receiver (not shown). Additionally or alternatively, the controller 124 may be configured to receive a command from a surface transmitter (not shown) for actuating the downhole tool depending on the code transmitted to the surface receiver (not shown).

An alternative ring arrangement 270 is shown FIG. 6(*b*). The ring arrangement 270 of FIG. 6(*b*) shares many like features with the ring arrangement 170 of FIG. 6(*a*) and, as such, like features share like reference numerals. The ring arrangement 270 comprises a series of rings, each ring having a first configuration, a second configuration or a checking configuration. In FIG. 6(*b*), rings configured according to the first configuration are identified by reference numeral 272, rings configured according to the second configuration are identified by reference numeral 274 and rings configured according to the checking configuration are identified by reference numeral 276. The rings 272, 274 and 276 have the same axial extent and the same outer diameter, but different inner diameters. The difference in inner diameter of the different configurations of rings 272, 274 and 276 means that the controller 124 measures a different characteristic frequency spectrum of the measured electrical signal for each different configuration.

One skilled in the art will appreciate that various modifications are possible to the downhole detection systems 10 and 110. For example, rather than comprising a secondary coil 134, the secondary electromagnetic element may comprise a series of rings such as one of the series of rings 170, 270. Although such a secondary electromagnetic element would be covered by the cover sleeve 132 and would not be accessible when the downhole tool 118 is in a de-actuated state, such a secondary electromagnetic element may be used to not only indicate the status of the downhole tool 118, but to also identify the downhole tool 118 after actuation of the downhole tool 118.

Rather than comprising a series of rings 170, 270, the further secondary electromagnetic element may comprise a series of coils. Each coil of wire may be configured such that electromagnetic coupling of each coil with the primary electromagnetic element 22, 122 provides a corresponding measured electrical signal having a characteristic frequency spectrum. In other words, each coil of wire may be configured so as to have a characteristic frequency response.

One or both of the shifting tools 14, 114 may comprise a further primary electromagnetic element in the form of a further primary coil (not shown). The addition of such a further primary coil may provide redundancy for more accurate and/or more reliable detection of the status and/or identity of a downhole tool 18, 118. Such a further primary coil may also serve as a spare primary coil which may be used in the event of failure of the primary coil 22, 122.

The invention claimed is:

1. A system for use in downhole detection comprising:
   a downhole arrangement defining a throughbore;
   a tool deployable through the throughbore of the downhole arrangement;
   a primary electromagnetic element provided on the deployable tool; and
   a secondary electromagnetic element provided on the downhole arrangement,
   wherein the primary and secondary electromagnetic elements are configurable for electromagnetic coupling therebetween,
   wherein the downhole arrangement is configurable between a first configuration in which the secondary electromagnetic element is covered so as to prevent electromagnetic coupling between the primary and secondary electromagnetic elements and a second configuration in which the secondary electromagnetic element is accessible for electromagnetic coupling with the primary electromagnetic element.

2. A system according to claim 1, wherein the downhole arrangement comprises a downhole tool.

3. A system according to claim 1, wherein the downhole arrangement is configurable for at least one of fluid injection, stimulation, fracturing and production.

4. A system according to claim 1, wherein the deployable tool comprises a shifting tool for actuating the downhole arrangement.

5. A system according to claim 1, wherein the primary and secondary electromagnetic elements are configurable for electromagnetic coupling at a frequency in a range of 10 kHz to 1 MHz, 50 kHz to 500 kHz, or 100 kHz to 150 kHz.

6. A system according to claim 1, comprising a controller which is configured to generate and apply an electrical signal to the primary electromagnetic element, to measure the electrical signal which results from any electromagnetic coupling between the primary electromagnetic element and the secondary electromagnetic element, and to determine a degree of electromagnetic coupling between the primary and secondary electromagnetic elements from the measured electrical signal.

7. A system according to claim 6, wherein the controller is configured to determine a degree of electromagnetic coupling between the primary and secondary electromagnetic elements according to a shape of a frequency spectrum of the measured electrical signal.

8. A system according to claim 6, wherein the controller is configured to determine a degree of electromagnetic coupling between the primary and secondary electromagnetic elements according to a shape or Q-factor of a resonant feature in the frequency spectrum of the measured electrical signal.

9. A system according to claim 6, wherein the controller is configured to log the determined degree of electromagnetic coupling between the primary and secondary electromagnetic elements in a memory.

10. A system according to claim 6, wherein the deployable tool comprises the controller.

11. A system according to claim 6, wherein the controller is configured for communication uphole.

12. A system according to claim 6, wherein the system comprises a power source for providing power to the controller.

13. A system according to claim 12, wherein the deployable tool comprises the power source.

14. A system according to claim 6, wherein the electrical signal exists on the primary electromagnetic element.

15. A system according to claim 6, wherein the electrical signal exists on a tertiary electromagnetic element provided on the deployable tool as a result of any electromagnetic coupling between the primary electromagnetic element and the tertiary electromagnetic element via the secondary electromagnetic element.

16. A system according to claim 1, wherein the primary electromagnetic element comprises a coil of wire arranged helically around a body portion of the deployable tool, the wire comprising an electrically conductive core surrounded by an electrically insulating outer layer.

17. A system according to claim 1, wherein the primary electromagnetic element is encapsulated in a potting compound.

18. A system according to claim 1, wherein the deployable tool comprises a primary enclosure and the primary electromagnetic element is housed within the primary enclosure.

19. A system according to claim 18, wherein the primary enclosure is filled with a potting compound.

20. A system according to claim 18, wherein the primary enclosure comprises a tubular base member and a tubular lid member, and the primary electromagnetic element is wrapped around the base member.

21. A system according to claim 20, wherein at least the lid member of the primary enclosure is transparent to an electromagnetic field at a frequency in a range of 10 kHz to 1 MHz, 50 kHz to 500 kHz, or 100 kHz to 150 kHz.

22. A system according to claim 1, wherein the secondary electromagnetic element is configured so that an electrical signal existing on the primary electromagnetic element when the primary and secondary electromagnetic elements are electromagnetically coupled has a predetermined frequency spectrum.

23. A system according to claim 22, wherein the predetermined frequency spectrum has a predetermined shape.

24. A system according to claim 22, wherein the predetermined frequency spectrum includes a resonant feature having a predetermined shape or a predetermined Q-factor.

25. A system according to claim 24, wherein the resonant feature has a predetermined resonant frequency for a given temperature and/or pressure to which the secondary electromagnetic element is exposed.

26. A system according to claim 1, wherein the secondary electromagnetic element extends around the throughbore of the downhole arrangement.

27. A system according to claim 1, wherein the secondary electromagnetic element comprises a coil of wire arranged helically about the throughbore of the downhole arrangement, the wire comprising an electrically conductive core surrounded by an electrically insulating outer layer.

28. A system according to claim 1, wherein the secondary electromagnetic element comprises a capacitor electrically connected between two ends of the core.

29. A system according to claim 1, wherein the secondary electromagnetic element is encapsulated in a potting compound.

30. A system according to claim 1, wherein the downhole arrangement comprises a secondary enclosure and the secondary electromagnetic element is housed within the secondary enclosure.

31. A system according to claim 30, wherein the secondary enclosure is filled with a potting compound.

32. A system according to claim 30, wherein the secondary enclosure comprises a tubular base member and a tubular lid member which define a annular cavity therebetween, the annular cavity having a radial extent selected so as to avoid electromagnetic coupling between the secondary electromagnetic element and a body portion of the downhole arrangement.

33. A system according to claim 32, wherein the secondary electromagnetic element is wrapped around the base member.

34. A system according to claim 32, wherein at least the base member of the secondary enclosure is transparent to an electromagnetic field at a frequency in a range of 10 kHz to 1 MHz, 50 kHz to 500 kHz, or 100 kHz to 150 kHz.

35. A system according to claim 1, wherein the secondary electromagnetic element comprises a plurality of coils of wire distributed axially along the downhole arrangement, each coil of wire being unconnected electrically to the other coils of wire, and each coil of wire extending helically around the throughbore of the downhole arrangement, the wire of each coil of wire comprising an electrically conductive core surrounded by an electrically insulating outer layer, and each coil of wire configured such that electromagnetic coupling of each coil with the primary electromagnetic element provides a corresponding measured electrical signal having a characteristic frequency spectrum.

36. A system according to claim 1, wherein the secondary electromagnetic element comprises an electrically conductive ring extending around the throughbore of the downhole arrangement.

37. A system according to claim 36, wherein the ring is defined by an annular portion of the downhole arrangement.

38. A system according to claim 36, wherein the secondary electromagnetic element comprises a plurality of rings distributed axially along a longitudinal axis of the downhole arrangement, each ring extending around the throughbore of the downhole arrangement.

39. A system according to claim 38, wherein each ring is configured such that electromagnetic coupling of each ring with the primary electromagnetic element provides a corresponding measured electrical signal having a characteristic frequency spectrum.

40. A system according to claim 39, wherein the configuration of a ring is defined at least in part by an inner profile of the ring.

41. A system according to claim 39, wherein the configuration of a ring is defined at least in part by an inner diameter of the ring.

42. A system according to claim 39, wherein the configuration of a ring is defined at least in part by a material from which the ring is formed.

43. A system according to claim 39, wherein the configuration of a ring is defined at least in part by an axial extent of the ring.

44. A system according to claim 39, wherein the configuration of each ring is selected from a finite set of different ring configurations.

45. A system according to claim 44, wherein the finite set of different ring configurations comprises a plurality of data ring configurations and a checking ring configuration which is different from the data ring configurations.

46. A system according to claim 45, wherein the plurality of rings defines a series of rings in which a checking ring configured according to the checking ring configuration is included repeatedly.

47. A system according to claim 46, wherein the plurality of rings defines the series of rings in which the checking ring configured according to the checking ring configuration is included with a regular axial periodicity.

48. A system according to claim 46, wherein alternate rings in the series of rings are the checking rings configured according to the checking ring configuration.

49. A system according to claim 44, wherein the plurality of rings defines a series of rings in which a series of ring configurations is repeated at least once.

50. A system according to claim 44, wherein the secondary electromagnetic element comprises an axially inner plurality of rings, a first axially outer plurality of rings, and a second axially outer plurality of rings, and wherein first and second series of ring configurations of the first axially outer plurality of rings and the second axially outer plurality of rings are different to one another and to a third series of ring configurations of the axially inner plurality of rings.

51. A system according to claim 1, wherein the downhole arrangement comprises a cover member; and wherein the secondary electromagnetic element and the cover member are moveable relative to one another so as to selectively configure the downhole arrangement between the first and second configurations.

52. A system according to claim 51, wherein the downhole arrangement is configurable between the first and second configurations on actuation or de-actuation of the downhole arrangement.

53. A system according to claim 51, wherein the secondary electromagnetic element is arranged radially outwardly of the cover member relative to a longitudinal axis of the throughbore of the downhole arrangement.

54. A system according to claim 51, wherein the cover member extends at least partially between the secondary electromagnetic element and the throughbore of the downhole arrangement in the first configuration and the cover member is at least partially withdrawn from between the secondary electromagnetic element and the throughbore of the downhole arrangement in the second configuration.

55. A system according to claim 1, wherein the downhole arrangement comprises a further secondary electromagnetic element configurable for electromagnetic coupling with the primary electromagnetic element, wherein the further secondary electromagnetic element is accessible for electromagnetic coupling with the primary electromagnetic element regardless of a status of the downhole arrangement.

56. A system according to claim 55, wherein the further secondary electromagnetic element comprises one or more of the same features as the secondary electromagnetic element.

57. A system according to claim 56, wherein the further secondary electromagnetic element is configured for location downhole of the secondary electromagnetic element.

58. A system according to claim 1, wherein the primary electromagnetic element comprises an electrical conductor and/or a coil of wire comprising an electrically conductive core surrounded by an electrically insulating outer layer.

59. A system according to claim 1, wherein the secondary electromagnetic element comprises an electrical conductor and/or a coil of wire comprising an electrically conductive core surrounded by an electrically insulating outer layer.

60. A downhole arrangement for use in downhole detection, the downhole arrangement defining a throughbore for deployment of a deployable tool therethrough and the downhole arrangement comprising secondary electromagnetic element configurable for electromagnetic coupling with a primary electromagnetic element provided on the deployable tool, wherein the downhole arrangement is configurable between a first configuration in which the secondary electromagnetic element is covered so as to prevent electromagnetic coupling between the primary and secondary electromagnetic elements and a second configuration in which the secondary electromagnetic element is accessible for electromagnetic coupling with the primary electromagnetic element.

61. A system for use in downhole detection comprising:
a downhole arrangement defining a throughbore;
a tool deployable through the throughbore of the downhole arrangement;
a primary electromagnetic element provided on the deployable tool; and
a secondary electromagnetic element provided on the downhole arrangement,
wherein the primary and secondary electromagnetic elements are configurable for electromagnetic coupling therebetween,
wherein the secondary electromagnetic element comprises a plurality of electrically conductive rings distributed axially along a longitudinal axis of the downhole arrangement, each ring extending around the throughbore of the downhole arrangement, and
wherein each ring is configured such that electromagnetic coupling of each ring with the primary electromagnetic element provides a corresponding measured electrical signal having a characteristic frequency spectrum.

62. A system for use in downhole detection comprising:
a downhole arrangement defining a throughbore;
a tool deployable through the throughbore of the downhole arrangement;
a primary electromagnetic element provided on one of the downhole arrangement and the deployable tool; and
a secondary electromagnetic element provided on the other of the downhole arrangement and the deployable tool; and
a controller,
wherein the primary and secondary electromagnetic elements are configurable for electromagnetic coupling therebetween, and
wherein the controller is configured to measure an electrical signal which varies with a degree of electromagnetic coupling between the primary and secondary electromagnetic elements and to determine the degree of electromagnetic coupling between the primary and secondary electromagnetic elements from measurements of the electrical signal across a range of frequencies.

63. A system according to claim 62, wherein the primary and secondary electromagnetic elements are configurable for electromagnetic coupling at a frequency in a range of 10 kHz to 1 MHz, 50 kHz to 500 kHz, or 100 kHz to 150 kHz.

64. A system according to claim 62, comprising a controller which is configured to generate and apply an electrical signal to the primary electromagnetic element, to measure the electrical signal which results from any electromagnetic coupling between the primary electromagnetic element and the secondary electromagnetic element, and to determine a degree of electromagnetic coupling between the primary and secondary electromagnetic elements from the measured electrical signal.

65. A system according to claim 64, wherein the electrical signal exists on the primary electromagnetic element.

66. A system according to claim 64, wherein the electrical signal exists on a tertiary electromagnetic element provided on the deployable tool as a result of any electromagnetic coupling between the primary electromagnetic element and the tertiary electromagnetic element via the secondary electromagnetic element.

67. A system according to claim 64, wherein the secondary electromagnetic element is configured so that the electrical signal has a predetermined frequency spectrum.

68. A system according to claim 67, wherein the controller is configured to determine the frequency spectrum of the measured electrical signal and to determine the degree of electromagnetic coupling between the primary and secondary electromagnetic elements from the determined frequency spectrum of the measured electrical signal.

69. A system according to claim 67, wherein the predetermined frequency spectrum has a predetermined shape.

70. A system according to claim 67, wherein the predetermined frequency spectrum includes a resonant feature.

71. A system according to claim 70, wherein the resonant feature has a predetermined resonant frequency for a given temperature and/or pressure to which the secondary electromagnetic element is exposed.

72. A system according to claim 70, wherein the resonant feature has a predetermined shape and/or a predetermined Q-factor.

* * * * *